March 15, 1955     N. M. LOVETT ET AL     2,704,060

WHEEL TRUING TOOL

Filed May 26, 1952

INVENTORS
NICHOLAS M. LOVETT
BY WILLIS G. DOYLE

ATTORNEYS

United States Patent Office 2,704,060
Patented Mar. 15, 1955

2,704,060

WHEEL TRUING TOOL

Nicholas Myron Lovett and Willis Grant Doyle,
Detroit, Mich.

Application May 26, 1952, Serial No. 289,946

6 Claims. (Cl. 125—37)

This invention relates to a wheel truing tool.

In the art of dressing of grinding wheels, it is common to use what is called a "rough dresser" or "wheel truer" which is composed of a plurality of hardened steel rowels mounted on a hub which has a frictional engagement with a supporting axle. Also used are "finish dressers" utilizing a special grinding wheel similarly mounted.

In the past, the clutch or drag mechanism has been subject to adjustment by the tool operator by the manipulation of a nut on the side of a tool so that the resistance to rotation is created largely by pressure on the bearings and may be large or small, depending on the particular operator that is adjusting the tool.

With this arrangement, variations have occurred wherein the dressing tool rotates too easily and performs no cutting operation or which rotates with too much resistance and causes irregularities to appear in both the dressing tool and the wheel. Furthermore, these constructions have been so designed that the drag load is directly on the bearings of the unit causing unnecessary wear and poor performance.

It is an object of the present invention to provide a truer tool which has a longer life and less breakage than tools now available, which is stronger due to the inherent design and which has an improved drag construction out of reach of the user of the tool so that it cannot be adjusted for overdrag or underdrag conditions.

It is a further object to provide a roughing tool having an even drag characteristic and also one which can be regulated only in the tool room by changing springs inside the unit. In addition, the friction mechanism is independent of the bearings, thus adding to the life of the unit as a whole.

Other objects and features of the invention, including end play control, improved cutter design for increased rigidity and support and detailed bearing arrangements, will be evident in the following description and claims.

Figure 1:
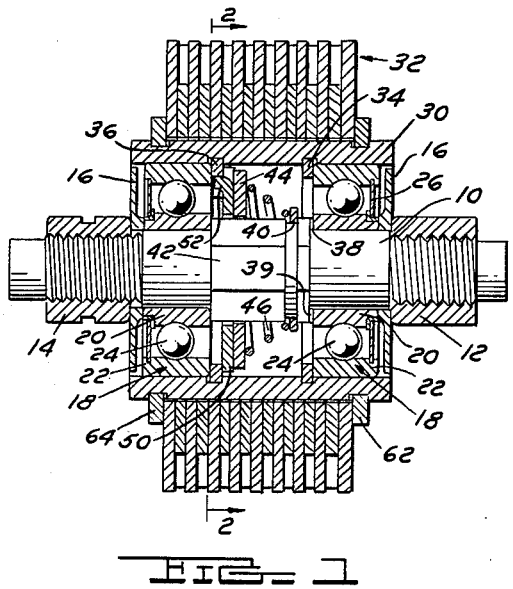
Figure 2:
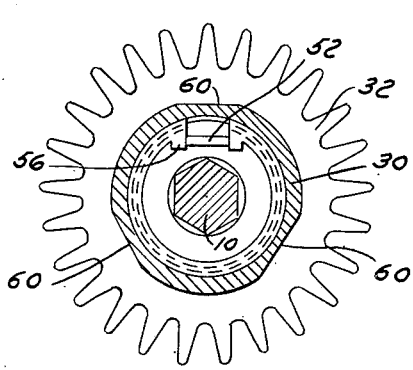
Figure 3:
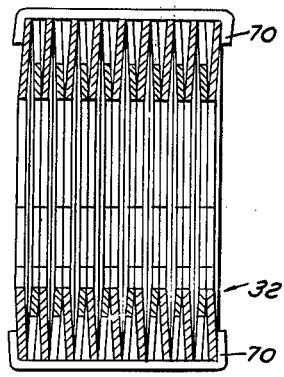
Figure 4:
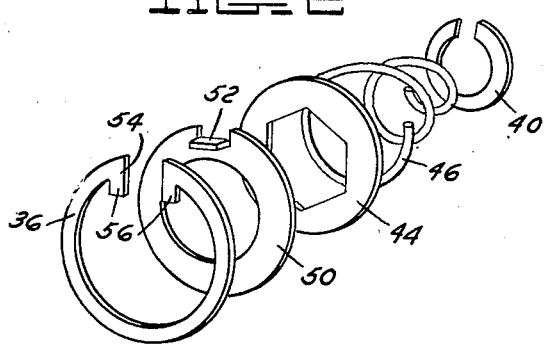

Drawings accompany the application, and the various views thereof may be briefly described as:

Figure 1, a sectional view of the assembled device.
Figure 2, a sectional view on line 2—2 of Figure 1.
Figure 3, a sectional view of a package of assembled cutters showing the relationship prior to assembly compression.
Figure 4, a perspective exploded view of the parts of the clutch mechanism showing the relationship thereof to each other.

Referring to the drawings, in Figure 1 the wheel dressing tool is mounted on a spindle 10 and the parts are retained between right and left nuts 12 and 14. Just inside the nuts are water slinger washers 16 which protect bearing assemblies 18. These bearing assemblies are especially adapted to the particular construction. They comprise inner races 20 and outer races 22, separated by balls 24. A special annular sealing plate 26 serves to seal the bearing against dust, grit and water. The bearings support a hub or barrel 30, which in turn supports the assembled cutters 32.

Between the bearing assemblies 18 is a drag or clutch mechanism. Expanding snap rings 34 and 36 locate the right- and left-hand bearings 18 respectively. An end-play washer 38 composed of a plurality of thin shims is interposed between the inner race 20 of the right-hand bearing and a shoulder 39 on the spindle 10. This washer 38 permits take-up of wear in the bearings.

The drag mechanism starts with a snap ring 40 located in an annular groove in the spindle 10. The center portion of the spindle is formed in hexagonal shape at 42; and co-operating with this center portion of the spindle is a friction disc 44.

Interposed between the friction disc 44 and the contacting snap ring 40 is a conical spring 46 which urges the friction disc 44 against a pressure plate 50 having an axially turned lug 52 which projects into an opening 54 in snap ring 36, the latter having two inwardly extending tabs 56 to form a locating recess (Figure 4).

With this construction above described, it will be seen that the friction disc 44 will remain stationary with the spindle while the pressure plate 50 will rotate with the barrel 30. The spring 46 will apply pressure between these two plates in a pre-determined degree, depending on the pressure desired; but it will be seen that the drag resulting from any particular installed spring will be substantially constant regardless of the wear on the parts.

The rowel-like cutters mounted on the barrel are held against rotation by three flat surfaces 60, Figure 2, and retained on the barrel by contracting snap rings 62 and 64. The barrel can be readily made from tubing, the hole being ground and the flat areas being milled. The barrel is completed by cutting out the grooves for the snap rings on a lathe or screw machine.

The cutting discs or rowels are formed with a plurality of radially projecting teeth and also have a dished shape or concave-convex as shown in Figure 3. The discs are identical, but they are assembled on the barrel by rotating each successive disc up to number eight 120 degrees in clockwise direction and the remaining nine of the total of seventeen 120 degrees in a counterclockwise direction. Also, the discs are assembled alternately in back-to-back and face-to-face relation, that is to say, convex to convex and concave to concave as shown in Figure 3.

With this arrangement each of the adjoining teeth of the discs are spaced a few degrees circumferentially from each other. The dishing of the discs as they are formed initially requires that the centers be compressed in the assembly, as shown in Figure 1, and thus the inherent resilience of the discs holds the entire package in rigid condition, and the breakage of one cutter in operation will not cause a loosening of all the other cutters.

As shown in Figure 3, the cutters are held in place by removable clamps 70 to illustrate the assembly.

Figure 4 shows the inner parts of the drag mechanism in spaced relation to illustrate the manner of their co-operation with each other.

It will thus be seen that there is disclosed a simple and effective drag mechanism for wheel dressing tools of all kinds and that the mechanism is completely housed so that it is not subject to the individual adjustment of any particular user. The device is also constructed so that regardless of wear the drag will be substantially the same throughout the life of the parts.

In addition, due to the fact that the cutter rowels are held on the barrel by snap rings the rowels may be worn down practically to the snap ring before the device needs to be re-assembled with new cutting rowels. Also, any other type of wheel dressing unit such as a special grinding wheel may be mounted on the same barrel and utilize the same drag mechanism.

We claim:

1. A wheel dressing tool of the type having a plurality of steel rowels mounted together on a hub connected by a mounting means for the hub on a supporting axle comprising bearings at each end of the hub co-operating with the axle and drag means interposed between said bearings having a portion associated with the hub and a portion associated with the axle, and means acting on said portions to exert predetermined frictional resistance to rotative motion between the hub and the axle.

2. A mounting for a rotative wheel dressing device comprising a supporting spindle member, a sleeve member rotatably supported on said spindle, sealing means to form a sealed-in chamber between said sleeve and spindle from the outside, and means to control rotation of the sleeve on said spindle comprising a friction disc associated with one of said members within said chamber, a pressure plate associated with the other of said members within said chamber, and means to urge said plate and disc together in frictional engagement.

3. A mounting for a rotative wheel dressing device comprising a supporting spindle member, a sleeve member rotatably supported on said spindle, sealing means to form a sealed-in chamber between said sleeve and spindle from the outside, and drag means within said chamber to control resistance to relative rotation between said spindle and sleeve.

4. A device as defined in claim 3 in which the sealing means comprises radially spaced bearing races in each end of said sleeve, a primary seal formed by a water slinger washer at each end of said sleeve, and a secondary seal formed by a radial annulus mounted on one of the races of said bearing at each end of said sleeve and projecting over a radially extending surface of said other race in close relation thereto.

5. A device as defined in claim 3 in which the drag means comprises adjoining friction plates within said chamber alternately associated rotatively with the spindle member and the sleeve member and means in said chamber to urge said plates toward each other to create a rotative drag between said members.

6. A device as defined in claim 3 in which the drag means comprises a spring retainer rotatively associated with said sleeve within said chamber, a friction plate interlocked with said retainer having radially extending surfaces, a second friction plate lying face to face with said first plate rotatively associated with said spindle, a spring retainer within said chamber on said spindle spaced from said plates, and spring means interposed between said last retainer and said plates to create frictional engagement between said plates.

References Cited in the file of this patent

UNITED STATES PATENTS

| | | |
|---|---|---|
| 242,046 | Roberts | May 24, 1881 |
| 970,992 | Collmer | Sept. 20, 1910 |
| 1,249,758 | Hoy | Dec. 11, 1917 |
| 1,383,601 | Conners | July 5, 1921 |
| 1,468,395 | Place | Sept. 18, 1923 |
| 1,518,413 | Ross | Dec. 9, 1924 |
| 1,552,005 | Ogle | Sept. 1, 1925 |
| 1,568,912 | Olin | Jan. 5, 1926 |
| 1,803,062 | Hohnhorst | Apr. 28, 1931 |